Patented Oct. 3, 1922.

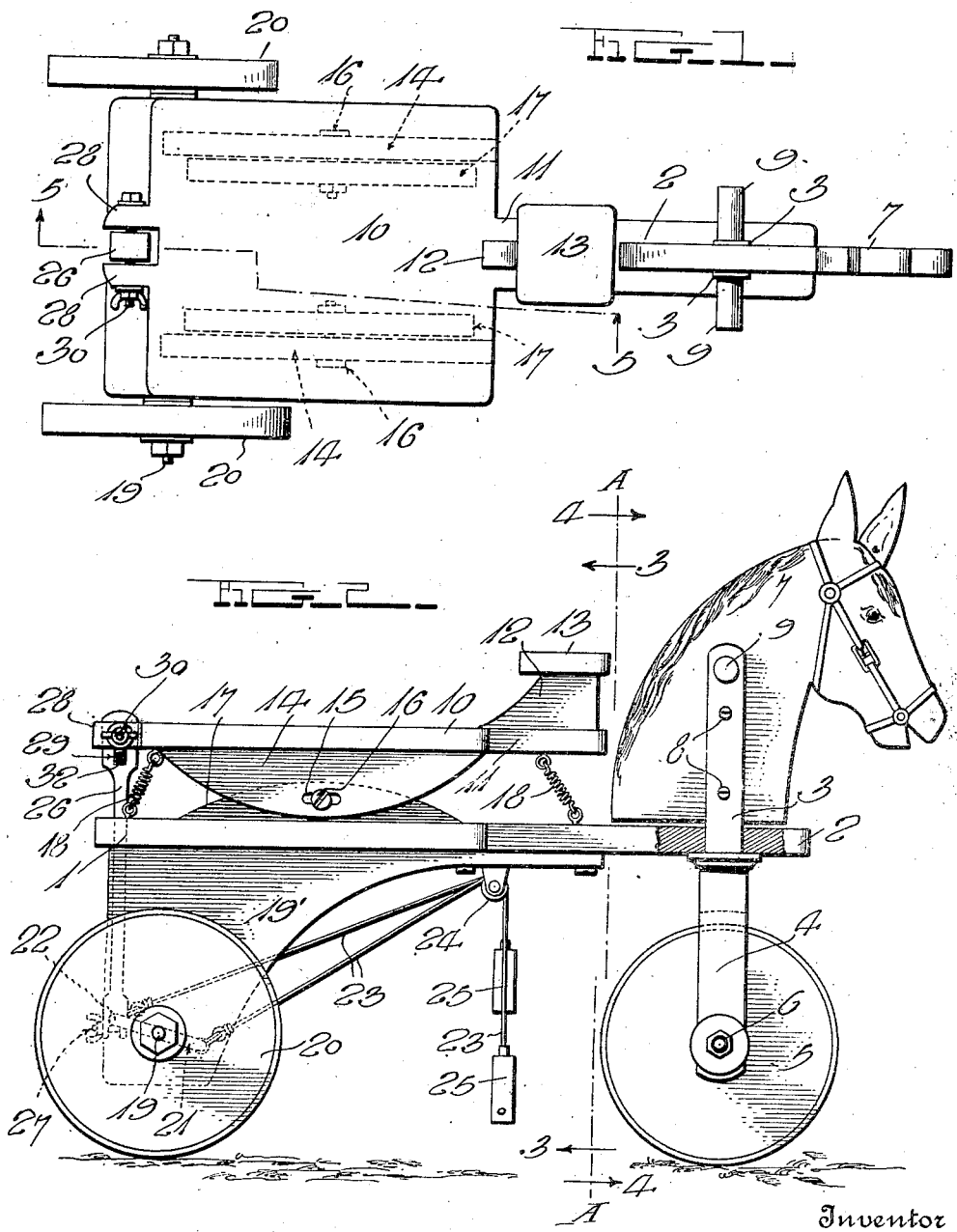

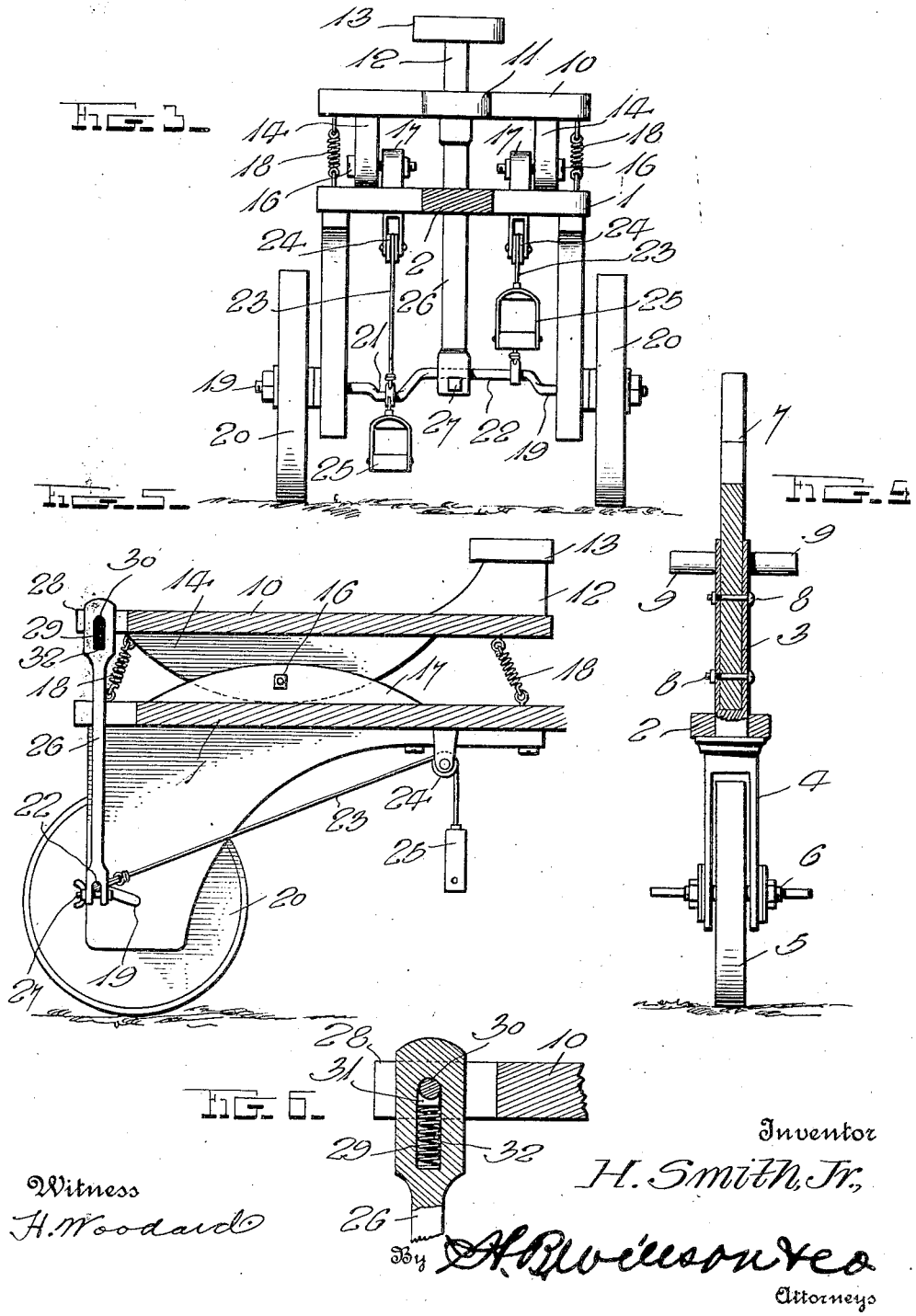

1,430,857

UNITED STATES PATENT OFFICE.

HUNTER SMITH, JR., OF SEATTLE, WASHINGTON, ASSIGNOR OF THREE-FOURTHS TO JAMES T. LAWLER, OF SEATTLE, WASHINGTON.

CHILD'S VEHICLE.

Application filed June 10, 1920, Serial No. 387,985. Renewed February 27, 1922. Serial No. 539,774.

*To all whom it may concern:*

Be it known that I, HUNTER SMITH, Jr., a citizen of the United States, residing at Seattle, in the county of King and State of Washington, have invented certain new and useful Improvements in Children's Vehicles; and I do declare the following to be a full, clear, and exact description of the invention, such as will enable others skilled in the art to which it appertains to make and use the same.

This invention relates to an improved child's vehicle and one object of the invention is to provide a vehicle having a seat which is so constructed and mounted that it may have a forward and rearward tilting movement and at the same time have a limited longitudinal-sliding movement to permit of easy rocking movement, the seat being connected with the crank shaft or driving shaft so that the movement may be transmitted to the seat as the driving shaft rotates to propel the vehicle.

Another object of the invention is to so construct this vehicle that the platform or seat will be normally held in a horizontal position but permitted to move freely when the vehicle is in motion.

Another object of the invention is to provide an improved type of connection between the seat and the pitman rod which leads from the crank shaft so that there is permitted a certain amount of play between the pitman and the seat as the pitman moves vertically and thus jolts and strain are done away with.

Another object of the invention is to so construct this vehicle that it may be very easily propelled and to so construct it that it may be guided either by the hands or by the feet.

This invention is illustrated in the accompanying drawings, wherein:—

Figure 1 is a top plan view of the improved vehicle.

Figure 2 is a side elevation of the improved vehicle.

Figure 3 is a vertical sectional view taken along the line A—A of Figure 2 and looking in the direction of the arrow 3—3, Figure 4 is a view along the same line looking in the direction of the arrow 4—4, Figure 5 is a vertical sectional view taken along the line 5—5 of Figure 1, and Figure 6 is an enlarged sectional view showing the connection between the seat and the pitman.

This improved vehicle is provided with a platform 1 which has its forward end portion reduced to provide a neck or tongue extension 2, the forward end portion of the neck having an opening formed therein to receive the stem or shank portion 3 of the fork 4. This fork carries the front wheel 5 which is mounted upon the axle 6, the axle extending beyond the fork to constitute foot rests upon which the feet will be placed when coasting. It will thus be seen that when coasting down a hill, the feet may be placed upon these foot rests and the fork may be turned by means of the feet to steer the vehicle. The shank of the fork above the platform is slit longitudinally and an ornamental head 7 will be secured in the slit of this shank by screws or other suitable and similar fasteners 8. A bar 9 is extended through the head and upper end portion of the shank thus providing handle bars which may be gripped by the hands for steering the car when the vehicle is being propelled by treadles as will be hereinafter brought out. In the present disclosure, the head has been shown as the head of a horse but it is to be understood that this is only a conventional showing and this head may represent any animal desired.

The seat or platform 10 is positioned above the platform 1 and is provided at its forward end with a neck 11 which will be positioned above the neck or tongue 2 and will carry an arm 12 which supports a head 13. This arm and head are intended to represent the forward pommel of a saddle. In order to mount the seat 10, this seat has been provided with rockers 14 which extend longitudinally of the seat and are provided with slots 15 through which screws, bolts or other similar fasteners 16 may be passed to pivotally and slidably connect the rockers 14 with the bars 17 carried by the platform 1. Springs 18 are positioned in front of and to the rear of the rockers 14 and will serve to yieldably retain the seat 10 in a horizontal position but will permit this seat to rock longitudinally. It will thus be seen that the seat may have the rocking movement and since the rockers are provided with slots 15, the seat will be permitted to move longitudinally to a limited extent thus permitting of easy rocking movement without danger of binding or breaking any of the parts.

In order to propel the car and impart rocking movement to the seat, there has been provided a crank shaft 19 which is journaled in bearings carried by the hanger bars 19' positioned beneath the platform 1. This crank shaft carries the rear wheels 20 which constitute the driving wheels and is provided with a relatively narrow crank arm extension 21 and a relatively wide crank arm extension 22. Lines 23 are connected with these crank arm extensions 21 and 22 and are carried forwardly and passed over pulleys 24 and connected with stirrups 25 in which the feet will be placed when the lines are to be drawn upon to impart rotary movement to the crank shaft and thus rotate the driving wheels 20 to move the vehicle forwardly. A pitman 26 is mounted upon the relatively wide crank arm extension 22 and held in engagement therewith by the removable pin 27. This pitman 26 extends upwardly through a slot or notch formed in the rear end portion of the platform 1 and extends between the fingers 28 at the rear end of the seat 10 and has its upper end portion provided with a slot 29 through which passes a removable pin 30. A bearing 31 is positioned in this slot 29 and is engaged by a spring 32 so that the bearing will be held in engagement with the pin and at the same time, the pitman permitted to have a certain amount of play during its longitudinal movement. Therefore, jolts will be taken up by the spring and breakage will be prevented.

When this device is in use, the operator will sit upon the platform 10 and will place his feet in the stirrups 25. By alternately pressing the stirrups downwardly, the crank shaft will be rotated and the vehicle propelled forwardly or rearwardly according to the direction in which the shaft 19 is rotated. When propelling the vehicle with the feet, it is necessary to steer by means of the handle bars 9 but if coasting down hill, the feet may be removed from the stirrups and placed upon the foot supports 6 and the vehicle steered by turning the fork 4 with the feet. As the vehicle moves along the ground the pitman 26 will be reciprocated vertically and the seat will be rocked upon the pivot pin 16. Therefore, the seat will be rocked longitudinally of the platform 1 and this will add to the amusement and enjoyment of driving the vehicle. If it is desired to use the vehicle without having the seat rock, it is simply necessary to remove the securing pins at the upper and lower ends of the pitman and this pitman can be removed and put away until it is again desired to make use of the same. It will thus be seen that there has been provided a child's vehicle which is provided with an improved seat construction causing the seat to have a rocking movement as the vehicle moves forwardly or rearwardly, the seat being actuated from the driving shaft carrying the propelling wheel.

What is claimed is:

1. A child's vehicle having a body portion and a rotatably mounted crank shaft having propelling wheels mounted thereon, a seat positioned above the platform and having rockers resting upon the platform, bars extending longitudinally of the platform, pivot pins carried by the bars and extending through longitudinally extending slots formed in the rockers to mount the seat for pivotal movement and movement longitudinally of the platform, means yieldably retaining the seat in a horizontal position, and means connecting the seat with the crank shaft for imparting rocking movement to the seat when the car is in motion.

2. A child's vehicle comprising a body portion having a platform, a crank shaft and supporting and propelling wheels mounted upon the crank shaft, a seat connected with the platform for pivotal movement and sliding movement longitudinally of the platform, resilient means yieldably retaining the seat against pivotal and sliding movement, and means for transmitting rocking movement from the crank shaft to the seat when the car is in motion.

3. A child's vehicle comprising a body having a wheel carrying crank shaft, a seat mounted above the body for rocking movement and sliding movement longitudinally of the body, means yieldably retaining the seat in a horizontal position, and means for imparting movement to the seat from the crank shaft when the car is in motion.

4. A child's vehicle comprising a body having a platform and hanger bars, a crank shaft rotatably connected with the hanger bars and having wheels mounted thereon, bearing bars extending longitudinally of the platform, a seat, rocker bars carried by the seat and having longitudinally extending slots, pins carried by the bearing bars and extending through the slots, springs connecting the forward and rear end portions of the seat with the platform to yieldably retain the seat in a horizontal position, a pitman mounted upon the crank shaft and having its upper end portion pivotally and slidably connected with the rear end portion of the seat and having in its upper end portion a bearing block yieldably held in engagement with a pivot pin carried by the seat, and means for imparting rotary movement to the crank shaft.

5. A child's vehicle comprising a body having a platform, a seat movably mounted above the platform for vertical rocking movement, a crank shaft rotatably mounted beneath the platform and having supporting wheels mounted thereon, means for imparting movement to the seat from the crank shaft, a fork journaled in the forward end portion of the platform, a supporting wheel having an axle extending through the fork to provide foot rests, an ornamental head secured in the upper portion of the fork above the platform and handle bars extending from the upper portion of the fork.

6. A child's vehicle comprising a body portion having a crank shaft carrying propelling wheels and having a guiding wheel, a seat connected with the body for rocking movement and having sliding movement longitudinally of the seat, and resilient means yieldably holding the seat against movement.

In testimony whereof I have hereunto set my hand in the presence of two subscribing witnesses.

HUNTER SMITH, Jr.

Witnesses:
 EUGENE A. CHILDE,
 JAY ELEY BENHAM.